US007339718B1

(12) United States Patent
Vodopyanov et al.

(10) Patent No.: US 7,339,718 B1
(45) Date of Patent: Mar. 4, 2008

(54) GENERATION OF TERAHERTZ RADIATION IN ORIENTATION-PATTERNED SEMICONDUCTORS

(75) Inventors: Konstantin L. Vodopyanov, San Jose, CA (US); Yun-Shik Lee, Corvallis, OR (US); Vladimir G. Kozlov, Eugene, OR (US); Martin M. Fejer, Menlo Park, CA (US)

(73) Assignees: Microtech Instruments Inc, Eugene, OR (US); State of Oregon acting by and though Oregon State Board of Higher Education on behalf of Oregon State University, Corallis, OR (US); The Board of Trustees of the Leland Stanford Junior University, Palo Alto, CA (US)

( * ) Notice: Subject to any disclaimer, the term of this patent is extended or adjusted under 35 U.S.C. 154(b) by 136 days.

(21) Appl. No.: 11/357,722

(22) Filed: Feb. 17, 2006

Related U.S. Application Data

(60) Provisional application No. 60/654,708, filed on Feb. 17, 2005.

(51) Int. Cl.
G02F 1/35 (2006.01)
G02F 2/02 (2006.01)
(52) U.S. Cl. ...................... 359/326; 359/330
(58) Field of Classification Search .......... 359/330
See application file for complete search history.

(56) References Cited

U.S. PATENT DOCUMENTS 5,355,247 A  10/1994 Byer et al.
6,273,949 B1  8/2001 Eyres et al.
6,697,186 B2 *  2/2004 Kawase et al. ............ 359/330
7,272,158 B1 *  9/2007 Hayes et al. ............... 372/21

OTHER PUBLICATIONS

Siegel, Peter H.; IEEE Transactions on Microwave Theory and Techniques, vol. 50 No. 3 p. 910 (Mar. 2002).
Lee et al; J. Opt. Soc. Am. B, vol. 19 No. 11 p. 2791 (Nov. 2002).
Helmy et al; Optics Letters, vol. 25 No. 18 p. 1370 (Sep. 2000).
Ferguson et al; Nature Materials, vol. 1 p. 26 (Sep. 2002).
Ding, Yujie J.; Optics Letters, vol. 29 No. 22 p. 2650 (Nov. 2004).

(Continued)

Primary Examiner—Michelle R. Connelly-Cushwa
(74) Attorney, Agent, or Firm—David S. Alavi

(57) ABSTRACT

A method for generating THz radiation comprises illuminating a semiconductor crystal with an optical pulse train. The semiconductor crystal comprises alternating parallel crystal domains, with each domain having a crystal orientation inverted with respect to adjacent domains. The optical pulse train propagates substantially perpendicularly relative to domain boundaries in the semiconductor crystal. The THz radiation is generated from the optical pulse train by optical down-conversion mediated by the semiconductor crystal. Optical path lengths through the crystal domains at least in part determine a frequency of the generated THz radiation. THz generation efficiency may be enhanced by placing the semiconductor crystal within an external resonant cavity, by placing the semiconductor crystal within a laser cavity, or by placing the semiconductor crystal within an OPO cavity. The semiconductor crystal may comprise zinc-blende, III-V, or II-VI semiconductor.

24 Claims, 5 Drawing Sheets

OTHER PUBLICATIONS

Lee et al; Applied Physics Letters, vol. 77 No. 9 p. 1244 (Aug. 2000).
Lee et al; Applied Physics Letters, vol. 82 No. 2 p. 170 (Jan. 2003).
Lee et al; Applied Physics Letters, vol. 76 No. 18 p. 2505 (May 2000).
Lee et al; Applied Physics Letters, vol. 78 No. 23 p. 3583 (Jun. 2001).
Sasaki et al; Applied Physics Letters, vol. 81 No. 18 p. 3323 (Oct. 2002).
Nahata et al; Applied Physics Letters, vol. 69 No. 16 p. 2321 (Oct. 1996).
Caumes et al; Physical Review Letters, vol. 89 No. 4 p. 47401 (Jul. 2002).
Yang et al; Applied Physics Letters, vol. 19 No. 9 (Nov. 1971).
Rice et al; Applied Physics Letters, vol. 64 No. 11 p. 1324 (Mar. 1994).
Xu et al; Applied Physics Letters, vol. 61 No. 15 p. 1784 (Oct. 1992).
Zhang et al; Applied Physics Letters, vol. 61 No. 23 p. 2764 (Dec. 1992).
Wu et al; Applied Physics Letters, vol. 68 No. 21 p. 2924 (May 1996).
Zhang et al; Physical Review Letters, vol. 69 No. 15 p. 2303 (Oct. 2002).
Corchia et al; Journal of Modern Optics, vol. 47 No. 11 p. 1837 (Sep. 2000).
Ahn et al; Optics Express, vol. 11 No. 20 p. 2486 (Oct. 2003).
Shi et al; Applied Physics Letters, vol. 83 No. 5 p. 848 (Aug. 2003).
Kawase et al; Applied Physics Letters, vol. 80 No. 2 p. 195 (Jan. 2002).
Vodopyanov, Konstantin L.; Optics Express, vol. 14 p. 2263 (2006).
Ding et al; Proceedings, Conference on Lasers and Electro-optics (May 2003).
Vodopyanov et al; Proceedings, Conference on Lasers and Electro-optics (May 2005).

* cited by examiner

GENERATION OF TERAHERTZ RADIATION IN ORIENTATION-PATTERNED SEMICONDUCTORS

BENEFIT CLAIMS TO RELATED APPLICATIONS

This application claims benefit of U.S. provisional App. No. 60/654,708 filed Feb. 17, 2005, said provisional application being hereby incorporated by reference as if fully set forth herein.

STATEMENT REGARDING FEDERALLY-SPONSORED RESEARCH

The invention was made in part using funds obtained from the United States Government under DARPA Award No. FA955-04-1-0465. The united States Government may retain certain rights to the invention.

BACKGROUND

The field of the present invention relates to generation of THz radiation. In particular, apparatus and methods are described herein for generating THz radiation in orientation-patterned semiconductors.

The terahertz regime of the electromagnetic spectrum is typically considered to span a frequency range of about $10^{11}$ Hz (0.1 THz) to about $10^{13}$ Hz (10 THz), situated between the microwave and infrared portions of the spectrum. This spectral region is of interest for a variety of materials characterization and diagnostic applications. For a variety of reasons, generation of radiation in the THz regime is complicated, and research for developing new THz sources is ongoing.

SUMMARY

A method for generating THz radiation comprises illuminating a semiconductor crystal with an optical pulse train. The crystal comprises alternating parallel crystal domains, with each domain having a crystal orientation inverted with respect to adjacent domains. The optical pulse train propagates substantially perpendicularly relative to domain boundaries in the semiconductor crystal. The THz radiation is generated from the optical pulse train by optical down-conversion mediated by the semiconductor crystal. Optical path lengths through the crystal domains at least in part determine a frequency of the generated THz radiation.

The semiconductor may comprise a zinc-blende semiconductor, a III-V semiconductor (such as GaAs for example), or a II-VI semiconductor. THz generation efficiency may be enhanced by placing the orientation-patterned semiconductor crystal within an external resonant cavity and coupling the optical pulse train into the cavity, by placing the semiconductor crystal within a laser cavity that produces the optical pulse train, or by placing the semiconductor crystal in an OPO cavity that produces the optical pulse train.

Objects and advantages pertaining to THz generation in semiconductors may become apparent upon referring to the exemplary embodiments illustrated in the drawings and disclosed in the following written description and/or claims.

The embodiments shown in the Figures are exemplary, and should not be construed as limiting the scope of the present disclosure and/or appended claims.

DETAILED DESCRIPTION OF EMBODIMENTS

For a variety of reasons, some zinc-blende semiconductors, including gallium arsenide (GaAs), other III-V semiconductors, and II-VI semiconductors are good candidate materials for THz generation by non-linear optical down-conversion (in which a higher-energy pump photon is split into two lower-energy photons, one of these being the THz photon). First, many of them are relatively transparent over at least some of the THz frequencies of interest, and also at infrared wavelengths useful for driving nonlinear optical properties for THz generation. Second, the non-linear optical coefficient may be relatively high, indicating a potential for efficient generation of THz radiation from shorter infrared wavelengths. Third, dispersion effects at the infrared and THz wavelengths of interest may be relatively low, in turn leading to relatively large coherence lengths and therefore long interaction lengths for THz generation in the material (see FIG. 1). For example, at a pump wavelength of about 1 µm, coherence lengths of 100 µm or more are observed for GaAs over a range of 1 to 5 THz, while at a pump wavelength of about 2 µm, coherence lengths greater than 200 µm and exceeding 500 µm are observed (and coherence lengths approaching 1 mm are expected below 1 THz). Fourth, many of these materials may be used for THz generation at or near room temperature. While the subsequent discussion may focus on GaAs, it should be noted that similar use of other zinc-blende semiconductor materials, including other III-V semiconductors or II-VI semiconductors, shall fall within the scope of the present disclosure or appended claims.

Figure 2:
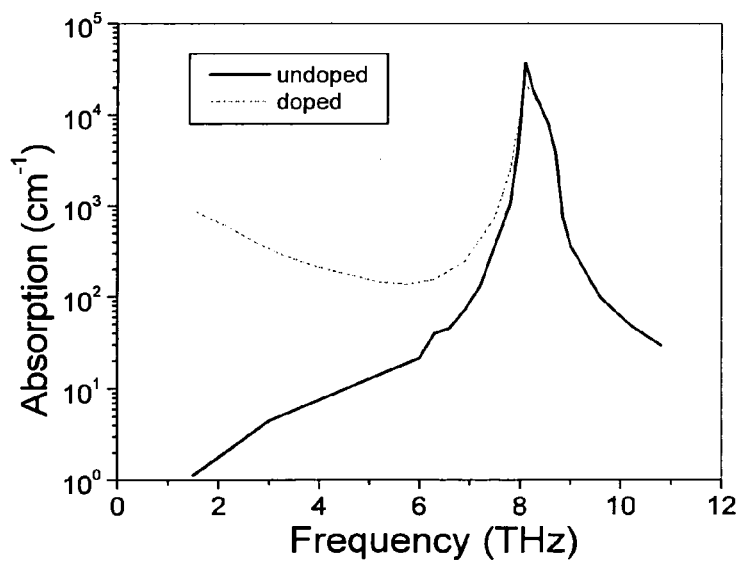
FIG. 2 shows absorption spectra in the THz region for doped and undoped GaAs.

Multi-photon absorption of ultrafast optical pump pulses in GaAs and other zinc-blende semiconductors tends to produce free carriers, which in turn results in significant THz absorption. Evidence for such free-carrier absorption may be observed in the absorption spectra of doped and undoped GaAs in FIG. 2. To reduce the effect of this absorption, undoped GaAs is typically used for THz generation, which is typically limited to THz frequencies less than about 3 THz. Longer pump wavelengths (around 2 µm for example, for avoiding the GaAs band edge for two-photon absorption, or around 3 µm, for example, for avoiding the GaAs band edge for three-photon absorption) may also reduce free carrier density, thus reducing THz absorption.

Figure 1:
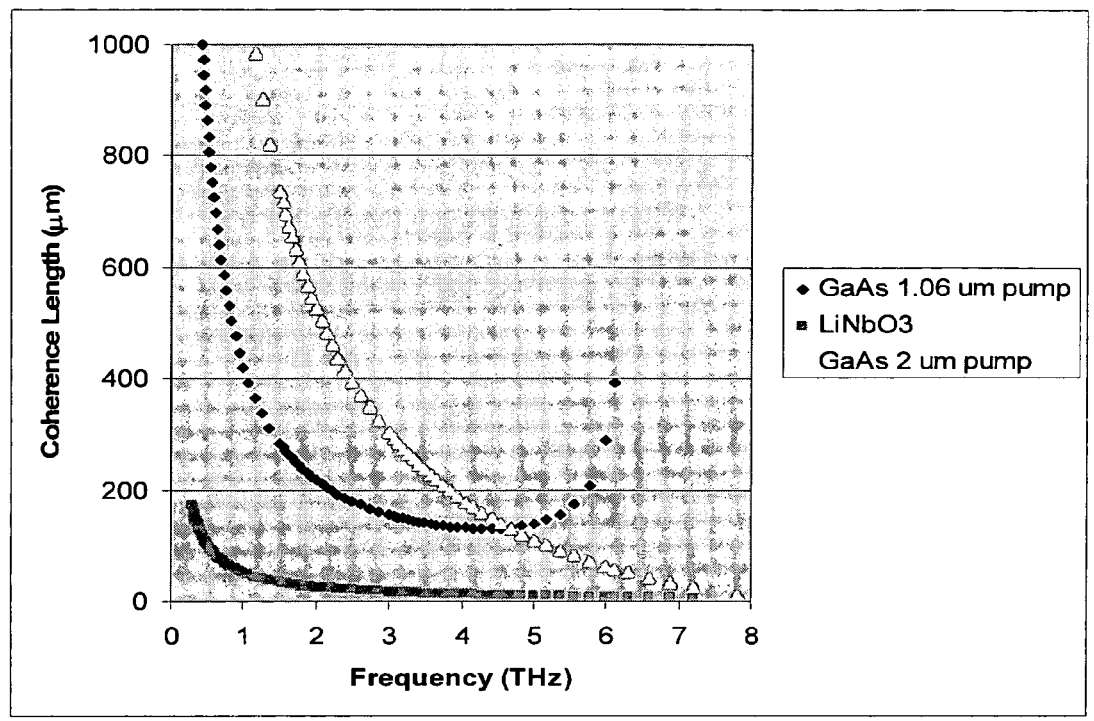
FIG. 1 shows the coherence length versus generated THz frequency for several combinations of non-linear optical crystal and pump wavelength.

Zinc-blende semiconductors do not exhibit anisotropy suitable for allowing phase-matched non-linear down-conversion. In the absence of phase matching, the interaction length in the material usable for non-linear down-conversion (i.e. the coherence length) is limited by the mismatch between the pump group velocity and the THz phase velocity to less than 1 millimeter and typically only a few hundred microns (FIG. 1). However, quasi-phase-matching (QPM) may be achieved by using an orientation-patterned semiconductor structures (OP-GaAs, for example). In an orientation-patterned material, periodic domain inversion is introduced into the material. The periodicity of the inversion is chosen to yield THz radiation centered at a particular design wavelength, for which the THz and pump wavelength accumulate a 180° phase difference as they propagate over the length of a domain. Inverting the domain "rephases" the pump and THz radiation, enabling down-conversion over much longer lengths of non-linear material.

Figure 3:
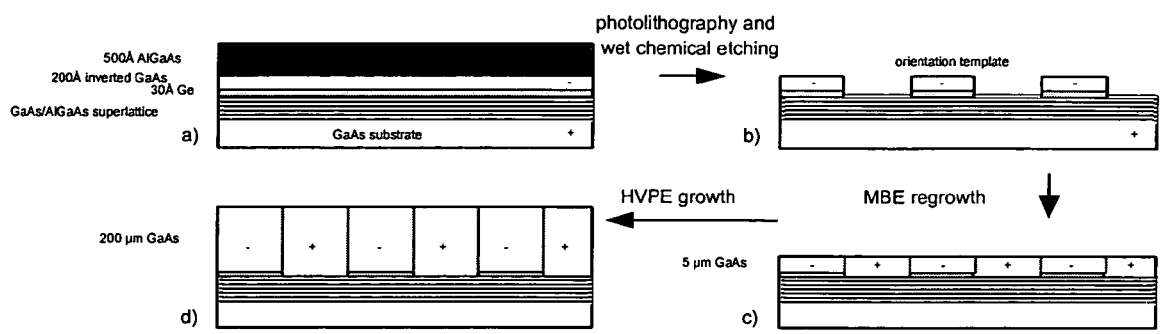
FIG. 3 schematically illustrates a fabrication sequence for forming an orientation-patterned GaAs crystal (OP-GaAs).

Fabrication of OP-GaAs is schematically illustrated in FIG. 3. A GaAs/AlGaAs superlattice is first formed on a GaAs substrate, and a thin layer of germanium (about 3 nm) is deposited over the superlattice. A "sublattice-reversed" or antiphase GaAs layer about 20 nm thick is formed on the Ge layer. The antiphase GaAs layer is then spatially patterned into parallel bands substantially perpendicular to the intended direction of optical propagation through the finished material, thereby forming a substrate template. The periodicity of the bands may be chosen based on the phase mismatch between the desired pump and THz wavelengths. Photolithography and wet chemical etching may be employed for patterning the antiphase layer, or any other suitable spatially-selective material processing technique(s) may be employed. After patterning the antiphase GaAs layer, subsequent GaAs material growth results in a sequence of inverted domains, each arising from growth on one of the patterned bands of the substrate template. Any suitable material growth technique may be employed. For example, molecular beam epitaxy (MBE) might be employed for forming relatively thin (5-10 μm, for example) periodic structures for subsequent formation of an optical waveguide. Alternatively, hydride vapor phase epitaxy (HVPE) might be employed for forming relatively thick (a few hundred micron or more, for example) periodic structures for enabling propagation therethrough of free-space optical beams. These deposition techniques may produce periodic structures up to several centimeters in length with good optical quality, enabling propagation therethrough of the pump radiation and the THz radiation.

Figure 4:
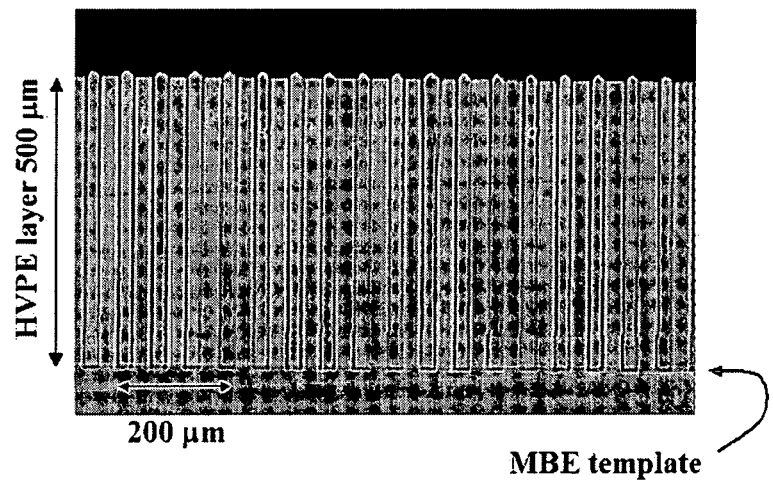
FIG. 4 shows an exemplary OP-GaAs crystal structure.

OP-GaAs material has been fabricated using the disclosed methods with periods ranging from about 27 μm up to about 212 μm, and have been characterized by cw CO2 laser second harmonic generation (SHG) and by mid-IR difference frequency generation (DFG). One example of material fabricated according to the disclosed methods is shown in FIG. 4 having a thickness of about 500 μm and a periodicity of about 60 μm. Intended optical propagation through this structure is substantially perpendicular to the domain-inverted layers, or substantially horizontally and in the plane of FIG. 4.

Figure 5:
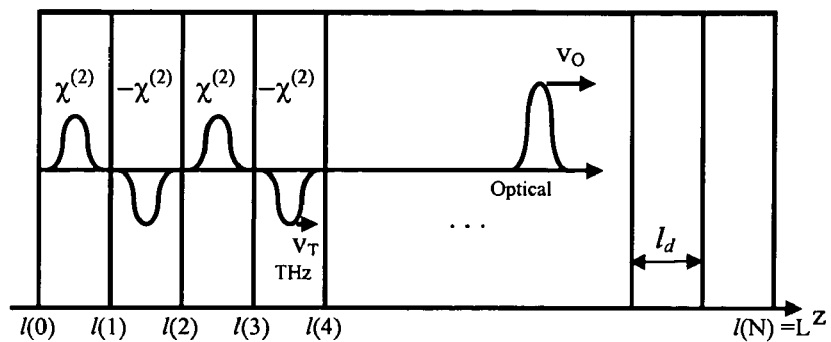
FIG. 5 schematically illustrates optical propagation and THz generation in an orientationally-patterned semiconductor crystal.
Figures 6A, 6B:
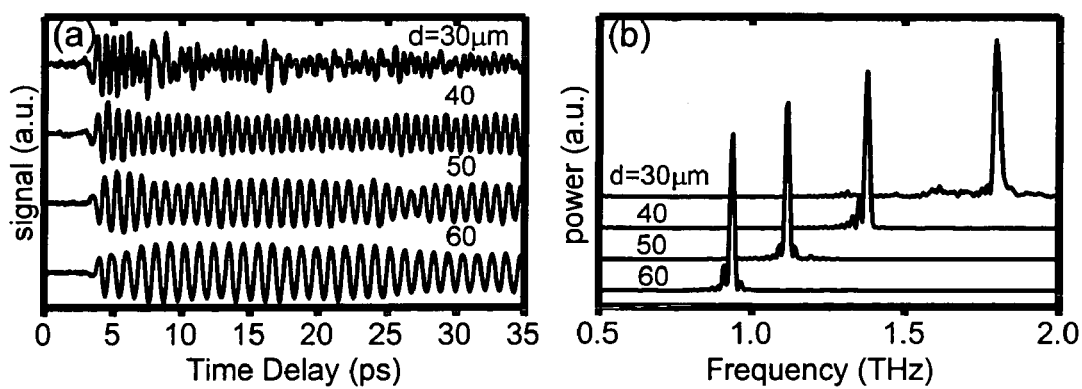
FIGS. 6A and 6B illustrate examples of THz waveforms and spectra arising from THz generation in OP-GaAs.

The second-order non-linear susceptibility $\chi^{(2)}$ changes sign between adjacent domains of the OP-GaAs material (FIG. 5). As a short optical pump pulse propagates through each domain of the OP-GaAs material, THz radiation is generated, but the velocity mismatch between the pump wavelength and the THz wavelength (indices of about 3.4 at about 2 μm and about 3.6 at about 2 THz, respectively) results in the pump pulse leading the THz radiation by about the optical pulse duration $\tau_p$ after a walk-off length $l_w = c\tau_p/(n_{THz} - n_{opt})$. If the domain length $l_d = \Lambda/2$ (where $\Lambda$ is the period of the OP-GaAs material) is substantially equal to the walk-off length, then each domain contributes one half-cycle to the generated THz radiation field, with successive half-cycles having opposites signs since they are generated in domains with opposite signs of the non-linear susceptibility. Since the length of the half-cycle pulse is proportional to the corresponding domain length, a multi-cycle THz pulse is generated with a center frequency of $v_{THz} = c/2l_d(n_{THz} - n_{opt})$ (FIGS. 6A and 6B). The resulting THz pulse comprises N/2 cycles, where N is the number of domains in the material, with a relative bandwidth $\Delta v_{THz}/v_{THz} \approx 2/N$. Frequency tuning of the THz radiation may be achieved by using GaAs material of various periodicities. The resulting THz frequencies generated may range between about 0.2 THz and about 5 THz, or between about 0.6 THz and about 3 THz, with bandwidths ranging between about 1 GHz to about 100 GHz or more, depending on the specific design of the OP-GaAs crystal. Optical power conversion occurs when the optical pulse width is chosen so that $l_d \approx l_w$. Instead of using periodic domains, domains of varying thickness may be employed for yielding a desired THz temporal waveform.

The emission frequency of the THz radiation propagating in the same direction as the optical pulse is defined by domain inversion period $\Lambda = c/(v_{THz}(n_{THz} - n_{opt}))$, where $n_{THz}$ is the refractive index of GaAs at THz frequency and $n_{opt}$ is the group index of an optical pulse. For counter-propagating waves $\Lambda = c/(v_{THz}(n_{THz} - n_{opt}))$. The spectral width is defined by the number of periods in the structure: $v_{THz}/\Delta v_{THz} = L/\Lambda = N$, where L is the length of the OP-GaAs structure and N is the number of periods. Considering a 3-cm-long structure as an example, we calculate 50 GHz spectral width for co-propagating and 1.4 GHz for counter-propagating designs. THz radiation with spectral bandwidth above 50 GHz can be generated in shorter OP-GaAs structures.

Optical down-conversion to generate THz radiation from an optical pulse may be viewed as a DFG process between the red and blue ends of the optical pulse spectrum. For short optical pulses (i.e. optical pulse duration $\tau < 1/\Omega_{THz}$), conversion efficiency from optical fluence to THz fluence may be estimated by $$\eta_{THz} \approx \frac{2\Omega_{THz}^2 d_{eff}^2}{\varepsilon_0 c^2 n_{THz} n_{opt}^2 \Delta n} \cdot L \cdot F_{opt}$$

where $\Omega_{THz} = 2\pi v_{THz}$ is the angular center frequency of the THz radiation, L is the overall crystal length, $F_{opt}$ is the optical fluence, and $\Delta n \equiv n_{THz} - n_{opt}^{gr}$ (group index). For optimal focusing (roughly confocal with respect to the THz wave, which substantially determines the ratio between beam area and crystal length), and from the known GaAs non-linear coefficient $d_{eff}$ and the refractive indices $n_{opt} = 3.43$ and $n_{THz} = 3.61$, the efficiency is $\eta_{THz} \approx 10^{-3}/\mu J$. For 10 μJ optical pulses, efficiencies of about 1% can be reached.

It should be noted that calculated internal conversion efficiencies may sometimes appear to exceed the Manley-Rowe conversion limit (i.e., one pump photon yields at most 1 THz photon, yielding an internal conversion efficiency limit of about 1.3% for a 2 μm pump producing 2 THz radiation). Such a seemingly paradoxical result may be explained by considering cascaded down-conversion in the OP-GaAs. Essentially, as each THz photon is produced one optical photon is red-shifted. For 2 THz generation by a 2 μm pump pulse, each THz photon generated results in about a 0.027 μm red-shift of a pump photon. As more THz photons are generated, the overall spectrum of the optical pulse is red-shifted, and these red-shifted optical photons can continue to generate THz photons while undergoing further red shifts. This process of generating multiple THz photons is referred to as cascaded optical down-conversion. The cascaded process may continue as long as the group velocity of the increasingly red-shifted photons remains sufficiently close to the THz phase velocity, or until group velocity dispersion temporally broadens the pump pulse sufficiently to disrupt the down-conversion process. It has been calculated that the most efficient cascaded down-conversion process in GaAs would occur with a pump pulse at about 6.6 μm, where the group velocity dispersion of GaAs reaches zero. As a practical matter, however, there are at present no compact ultrafast laser sources that operate near 6.6 μm. At a pump wavelength of about 2 μm, the group velocity dispersion is sufficiently small to allow multiple cascaded down-conversion steps, and there are compact ultrafast laser sources operating near this wavelength.

Figure 7:
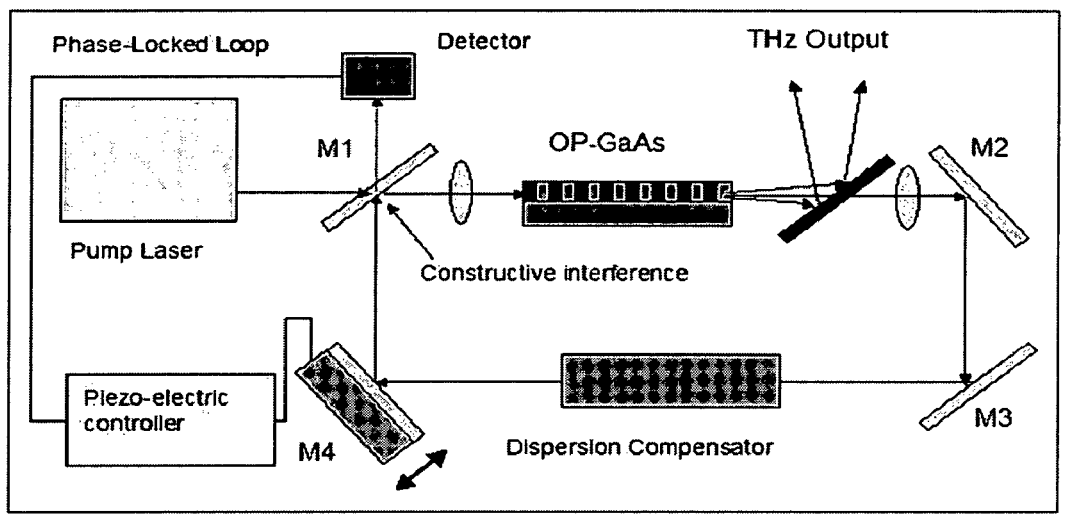
FIG. 7 schematically illustrates an optical pulse train coupled into an external resonant cavity (ERC) containing an OP-semiconductor crystal for THz generation.

The cascaded down-conversion process in OP-GaAs may be enhanced by placing the OP-GaAs crystal in an external resonant cavity (ERC; FIG. 7). Optical pump power build-up in such a cavity will be about a F times the input power, where F is the finesse of the external resonant cavity. For example, an ERC with a finesse of 10 and 1 W of incident pump power will support about 10 W of circulating intracavity power. If an OP-GaAs crystal as described hereinabove is placed in such a cavity at an appropriately-sized beam waist thereof (formed by lenses L1 and L2), the 10 W is the effective pump power seen by the crystal, resulting in internal conversion to THz radiation of about 4.4%. Accounting for THz absorption of the GaAs and the incident power of 1 W, the overall THz output of about 100 mW represents an external conversion efficiency of about 10%. In order to achieve power build-up in the ERC, a feedback mechanism must be implemented and coupled to a position actuator for one of the cavity mirrors to match the ERC cavity repetition rate to the pump pulse laser repetition rate (FIG. 7). One suitable feedback mechanism may comprise phase-locking using the Pound-Drever-Hall technique, for example. Any other suitable feedback scheme may be employed. A dispersion compensator is inserted into the cavity to compensate for group velocity dispersion in the OP-GaAs crystal, lenses, THz output mirror, or any other potentially dispersive components. Any suitable dispersion compensator may be employed, including a prism sequence, dispersive optical coatings, a Gires-Tournois interferometer, optical fiber, and so forth. It is estimated that with proper dispersion compensation, an ERC THz generator with an OP-GaAs crystal may enable about 3 cascaded down-conversions before degradation or the cavity finesse (since THz generation represents a source of intracavity loss) disrupts the down-conversion process.

Figure 8:
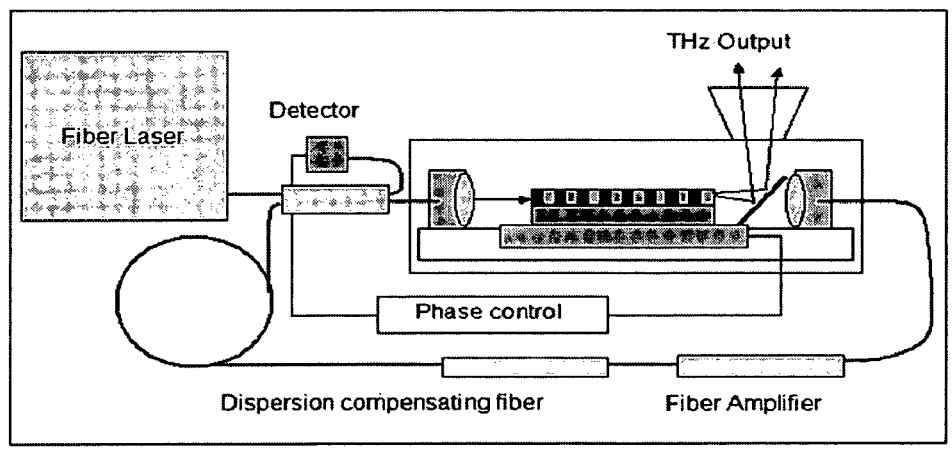
FIG. 8 schematically illustrates an optical pulse train coupled into an optical fiber external resonant cavity (ERC) containing an OP-semiconductor crystal for THz generation.

An ERC OP-GaAs THz source as disclosed herein may be made more robust by including one or more lengths of optical fiber for coupling the pump pulses into the ERC, or for forming a portion of the ERC. Fiber coupling may be particularly convenient for use with a fiber laser source for the optical pump pulses. A diode-pumped fiber laser also offers robust operation and relatively high (as high as 10%) efficiency in converting electrical power to optical power in the form of an ultrafast pulse train, which, coupled with the THz generation efficiencies disclosed hereinabove, may yield an overall electrical-to-THz efficiency of about 1%. FIG. 8 illustrates schematically an ERC for THz generation incorporating optical fiber for portions of the resonator. The only free-space propagation of the pump pulses is through the OP-GaAs crystal between lens couplers C1 and C2. The rest of the ERC is in optical fiber, which may include fiber sections for dispersion compensation or for optical amplification. A diode-pumped optical fiber amplifier incorporated into the ERC may compensate for pump power lost upon coupling into the ERC, or for pump power lost to THz generation. It may be necessary to employ hollow-core optical fiber to reduce dispersion in the ERC to a manageable level. Phase compensation for phase-locking the ERC to the pump pulse repetition rate may be readily accomplished by temperature tuning the OP-GaAs crystal. Through the temperature-dependent refractive index, a temperature change of only 0.25° C. results in a $2\pi$ phase shift at a wavelength of about 2 μm in a 3 cm long GaAs crystal.

Figure 9:
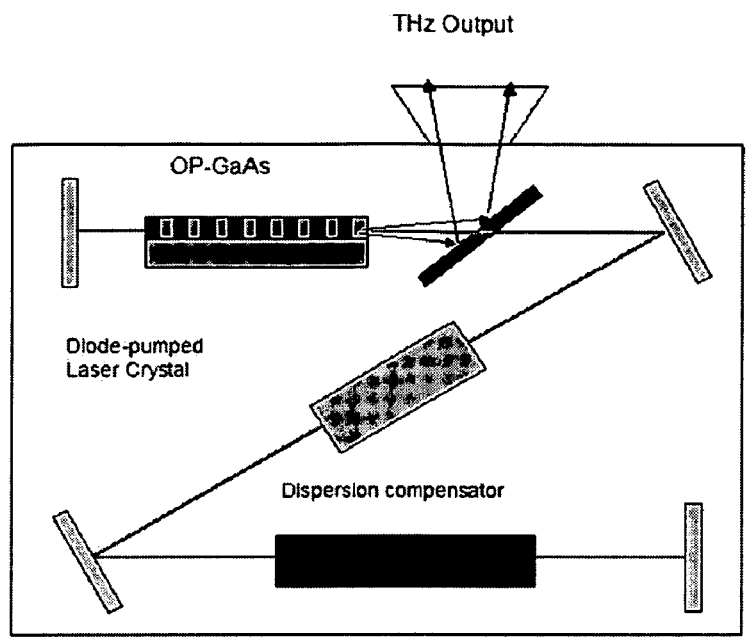
FIG. 9 schematically illustrates an OP-semiconductor crystal positioned within a laser cavity for THz generation.

It may be advantageous to combine the functionalities of the optical pump laser source and an external resonant cavity into a single unit (FIG. 9). An ultrafast laser source may be constructed with an intracavity OP-GaAs crystal. Operation of the laser results in high intracavity intensities incident on the OP-GaAs crystal, similar to the case with an ERC. The need for phase locking between cavities is eliminated, since the laser cavity and the resonant cavity for THz generation are the same cavity. A diode-pumped Cr:ZnSe laser operating at about 2.5 μm is one example of a suitable laser gain medium for intracavity THz generation. Other laser media operating at suitable optical pump wavelengths may be employed. The laser source would require the usual dispersion compensation for ultrafast operation, with the additional capacity to compensate for the dispersion of the OP-GaAs crystal. An intracavity output coupler dumps the generated THz radiation out of the cavity. All laser cavity mirrors may be made maximally reflecting at the optical pump wavelength to increase the intracavity optical power; the THz generator (i.e. the OP-GaAs crystal) serves as the laser output coupler. The laser cavity may be configured so as to produce an appropriately sized beam waist at the intracavity location of the OP-GaAs crystal. Several cascaded down-conversion steps may occur before the loss due to THz generation begins to degrade the performance of the ultrafast laser source by introducing excessive loss at the optical pump wavelength (i.e. the oscillating wavelength of the laser cavity).

Figure 10:
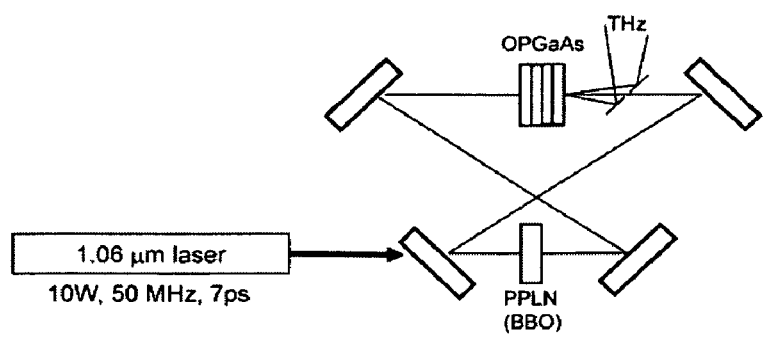
FIG. 10 schematically illustrates an OP-semiconductor crystal positioned within an OPO cavity for THz generation.

A wider range of optical pump wavelengths for THz generation may be made more readily accessible by using an optical parametric oscillator (OPO) as the source of optical pump power. FIG. 10 illustrates schematically an OPO cavity synchronously pumped by a modelocked Nd:YAG laser. Any suitable non-linear crystal may be employed in the OPO, including lithium niobate (LN), β-barium borate (BBO), and so forth. The OPO may be widely tuned, and may produce the optical pump pulse train tunable from below 2 μm to beyond 3 μm. Dispersion compensation may be employed, if needed or desired. The OPO cavity may be constructed with an intracavity OP-GaAs crystal, similar to the cases of the ERC or the laser cavity disclosed hereinabove. With the OPO cavity resonant at the desired optical pump wavelength for THz generation, high intensities may be achieved at the intracavity OP-GaAs crystal. The broader tunability of the OPO enables use of longer pump wavelengths. In particular, the optical pump wavelength may be readily tuned to near 3 μm, enabling substantial avoidance of both two- and three-photon absorption of optical pump photons that would in turn result absorption of THz radiation by free-carriers. The OPO cavity mirrors are all maximally reflecting for the optical pump wavelength, and THz generation in the OP-GaAs acts as an output coupler.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: i) it is explicitly stated otherwise, e.g., by use of "either . . . or", "only one of . . . ", or similar language; or ii) two or more of the listed alternatives are mutually exclusive within the particular context, in which case "or" would encompass only those combinations involving non-mutually-exclusive alternatives. It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure or appended claims.

What is claimed is:

1. A method for generating THz radiation, comprising illuminating a semiconductor crystal with an optical pulse train, wherein:
   the semiconductor crystal comprises alternating parallel crystal domains, with each domain having a crystal orientation inverted with respect to adjacent domains;
   the optical pulse train propagates substantially perpendicularly relative to domain boundaries in the semiconductor crystal;
   the THz radiation is generated from the optical pulse train by optical down-conversion mediated by the semiconductor crystal;
   optical path lengths through the crystal domains at least in part determine a frequency of the generated THz radiation;
   the semiconductor crystal is positioned within an external resonant cavity;
   the optical pulse train is coupled into the external resonant cavity;
   a feedback mechanism substantially matches a cavity resonance to a repetition rate of the optical pulse train;
   the cavity includes a dispersion compensation mechanism; and
   the generated THz radiation is directed out of the cavity.

2. The method of claim 1, wherein:
   the number of domains at least in part determines a spectral bandwidth of the generated THz radiation; or
   the domains are substantially periodic, and a domain period at least in part determines the frequency of the generated THz radiation.

3. The method of claim 1, wherein the semiconductor crystal comprises a zinc-blende semiconductor, a III-V semiconductor, GaAs, or a II-VI semiconductor.

4. The method of claim 1, wherein a wavelength of the optical pulse train is between about 1 µm and about 10 µm, and the frequency of the generated THz radiation is between about 0.2 THz and about 5 THz.

5. The method of claim 4, wherein the wavelength of the optical pulse train is between about 1.5 µm and about 3.5 µm.

6. The method of claim 4, wherein the optical pulse train is produced by a diode-pumped fiber laser.

7. The method of claim 1, wherein the optical pulse train is focused through the semiconductor crystal in a substantially confocal geometry.

8. The method of claim 1, wherein at least a portion of the cavity comprises optical fiber.

9. The method of claim 1, wherein the cavity includes an optical gain medium.

10. A method for generating THz radiation, comprising illuminating a semiconductor crystal with an optical pulse train, wherein:
    the semiconductor crystal comprises alternating parallel crystal domains, with each domain having a crystal orientation inverted with respect to adjacent domains;
    the optical pulse train propagates substantially perpendicularly relative to domain boundaries in the semiconductor crystal;
    the THz radiation is generated from the optical pulse train by optical down-conversion mediated by the semiconductor crystal;
    optical path lengths through the crystal domains at least in part determine a frequency of the generated THz radiation;
    the semiconductor crystal is positioned within a laser cavity;
    the optical pulse train comprises resonant intracavity radiation of the laser cavity;
    the laser cavity includes an optical gain medium and a dispersion compensation mechanism; and
    the generated THz radiation is directed out of the laser cavity.

11. The method of claim 10, wherein:
    the number of domains at least in part determines a spectral bandwidth of the generated THz radiation; or
    the domains are substantially periodic, and a domain period at least in part determines the frequency of the generated THz radiation.

12. The method of claim 10, wherein the semiconductor crystal comprises a zinc-blende semiconductor, a III-V semiconductor, GaAs, or a II-VI semiconductor.

13. The method of claim 10, wherein a wavelength of the optical pulse train is between about 1 µm and about 10 µm, and the frequency of the generated THz radiation is between about 0.2 THz and about 5 THz.

14. The method of claim 13, wherein the wavelength of the optical pulse train is between about 1.5 µm and about 3.5 µm.

15. The method of claim 13, wherein the optical pulse train is produced by a diode-pumped fiber laser.

16. The method of claim 10, wherein the optical pulse train is focused through the semiconductor crystal in a substantially confocal geometry.

17. The method of claim 10, wherein the optical gain medium comprises an optical fiber gain medium.

18. A method for generating THz radiation, comprising illuminating a semiconductor crystal with an optical pulse train, wherein:
    the semiconductor crystal comprises alternating parallel crystal domains, with each domain having a crystal orientation inverted with respect to adjacent domains;
    the optical pulse train propagates substantially perpendicularly relative to domain boundaries in the semiconductor crystal;
    the THz radiation is generated from the optical pulse train by optical down-conversion mediated by the semiconductor crystal;
    optical path lengths through the crystal domains at least in part determine a frequency of the generated THz radiation;
    the semiconductor crystal is positioned within an OPO cavity;

the OPO is synchronously-pumped by a modelocked pump laser;

the optical pulse train comprises resonant intracavity radiation of the OPO cavity; and the generated THz radiation is directed out of the OPO cavity.

19. The method of claim 18, wherein:

the number of domains at least in part determines a spectral bandwidth of the generated THz radiation; or the domains are substantially periodic, and a domain period at least in part determines the frequency of the generated THz radiation.

20. The method of claim 18, wherein the semiconductor crystal comprises a zinc-blende semiconductor, a III-V semiconductor, GaAs, or a II-VI semiconductor.

21. The method of claim 18, wherein a wavelength of the optical pulse train is between about 1 µm and about 10 µm, and the frequency of the generated THz radiation is between about 0.2 THz and about 5 THz.

22. The method of claim 21, wherein the wavelength of the optical pulse train is between about 1.5 µm and about 3.5 µm, and the frequency of the generated THz radiation is between about 0.2 THz and about 5 THz.

23. The method of claim 21, wherein the optical pulse train is produced by a diode-pumped fiber laser.

24. The method of claim 18, wherein the optical pulse train is focused through the semiconductor crystal in a substantially confocal geometry.

* * * * *